(12) United States Patent
Persson et al.

(10) Patent No.: US 6,531,167 B1
(45) Date of Patent: Mar. 11, 2003

(54) PROCESS FOR PREPARATION OF NUTRITIONAL SUPPLEMENT FOR ANIMALS

(75) Inventors: Lars Persson, Helsingborg (SE); Leif Olsson, Helsingborg (SE)

(73) Assignee: Kemira Kemi AB, Helsingborg (SE)

( * ) Notice: Subject to any disclaimer, the term of this patent is extended or adjusted under 35 U.S.C. 154(b) by 0 days.

(21) Appl. No.: 09/807,469

(22) PCT Filed: Oct. 11, 1999

(86) PCT No.: PCT/SE99/01827

§ 371 (c)(1),
(2), (4) Date: Jun. 19, 2002

(87) PCT Pub. No.: WO00/24268

PCT Pub. Date: May 4, 2000

(30) Foreign Application Priority Data

Oct. 13, 1998 (SE) ............................................. 9803478

(51) Int. Cl.⁷ ............................ A23K 1/175; A23K 1/00
(52) U.S. Cl. ......................... 426/74; 426/454; 426/807
(58) Field of Search ........................... 426/74, 454, 807

(56) References Cited

U.S. PATENT DOCUMENTS

| 4,160,041 A | | 7/1979 | Schroeder et al. ............ 426/69 |
|---|---|---|---|
| 4,996,065 A | | 2/1991 | Van De Walle ................ 426/72 |
| 4,997,469 A | * | 3/1991 | Moore ............................. 71/11 |
| 5,019,148 A | | 5/1991 | Moore ............................. 71/11 |
| 5,021,077 A | * | 6/1991 | Moore ............................. 71/17 |
| 5,021,247 A | * | 6/1991 | Moore ........................... 426/69 |

FOREIGN PATENT DOCUMENTS

| EP | 024509 B1 | 1/1980 |
|---|---|---|
| EP | 090995 A1 | 3/1983 |
| EP | 175805 A1 | 9/1984 |
| EP | 155251 A1 | 4/1985 |
| EP | 360600 A2 | 9/1989 |

* cited by examiner

Primary Examiner—Chhaya D. Sayala
(74) Attorney, Agent, or Firm—Birch, Stewart, Kolash & Birch, LLP

(57) ABSTRACT

The present invention relates to a process for preparation of a granular composition, which comprises magnesium and phosphorus. In the process, magnesium oxide is granulated with addition of a granulating liquid, which contains phosphoric acid and water. According to the invention, the granulating liquid, besides phosphoric acid and water, also contains sulphuric acid.

6 Claims, No Drawings

PROCESS FOR PREPARATION OF NUTRITIONAL SUPPLEMENT FOR ANIMALS

The present invention relates to a process for preparation of a nutritional supplement for animals. More specifically, the present invention relates to a process for preparation of a granular composition, which comprises magnesium and phosphorus, magnesium oxide being granulated with addition of a granulating liquid, which contains phosphoric acid and water.

Currently, a number of different nutritional supplements for animals are available, which comprise magnesium and phosphorus and are provided in granulates.

The inconvenience of today's compositions resides in that the magnesium availability and the physical stability of the granulate vary, and these two parameters tend to be mutually counteracting. As a result, a composition having a high degree of physical stability often has a low degree of magnesium availability, whereas compositions having a high degree of magnesium availability have a low degree of physical stability.

It is important for the compositions to have a high degree of stability. Otherwise the compositions will easily lose its physical form during transport and crumble into a powder. The powder form makes the composition difficult to handle since the composition produces dust, which is unhealthy to both humans and animals when handling and feeding it to animals.

Moreover, it is important for economic reasons that the composition should have as high a degree of magnesium availability as possible in order to be able to minimise the amount of the composition which must be added to the feeding stuff.

U.S. Pat. No. 4,996,065 discloses a binding agent for pelletising and compressing feeding stuff. The binding agent comprises a chemically reactive mixture of a reactive phosphate source, which can be phosphoric acid, and a reactive metal hydroxide or a reactive metal salt, which can be MgO.

U.S. Pat. No. 4,160,041 discloses a process for preparation of a solid nutritional supplement in which use is made of the spontaneous reaction between a metal oxide, e.g. MgO, and a water-soluble phosphate, e.g. phosphoric acid, to convert the product into solid form.

U.S. Pat. No. 5,019,148 discloses a stepwise process for preparation of a homogenous mineral granulate. This is achieved by a co-reaction between acids and bases, which have the property of forming a liquid binding agent, which hardens after a determined time to form a strong granulate-binding cement. As examples of acids may be mentioned any member of the group consisting of phosphoric acid, acetic acid, oxalic acid, sulphuric acid, citric acid and polyphosphoric acid. Examples of bases are hydroxides, oxides and carbonates of alkali metals and alkaline earth metals.

EP-A1-175,805 discloses the preparation of feeding stuff phosphate having a low fluorine content and a high degree of phosphoric availability. A phosphorus-containing base material, such as apatite, is treated with a defluorinating agent by grinding, briquetting and heating the mixture at 1000–1450° C., after which the melt is cooled and granulated with water and compressed air. After the granulation, the prepared granules are treated with a mixture of phosphoric acid and sulphuric acid and wet ground to a particle size of 200 µm maximum and dried, which results in a powder.

EP-A2-360,600 discloses the preparation of licking stones for the distribution of minerals to domestic animals. It comprises the step of producing a block, which contains a carbohydrate material, such as molasses, a phosphate material in particle form, an acid, such as sulphuric acid, and an oxide or a hydroxide of an alkaline earth metal, such as magnesium oxide. The addition of sulphuric acid is intended to bring the phosphoric compounds to a form which is more available to the animals.

One object of the present invention is to provide a process for preparation of a composition of magnesium and phosphorus, said composition having a high degree of stability, yet a high degree of magnesium availability.

Other objects, features and advantages of the present invention will appear from the description below.

These objects are achieved by means of a process according to appended claim 1. Particularly preferred embodiments are stated in the dependent claims.

In summary, the present invention relates to a process for preparation of a granular composition, which comprises magnesium and phosphorus. In the process, magnesium oxide is granulated with addition of a granulating liquid, which contains phosphoric acid and water. According to the invention, the granulating liquid, besides phosphoric acid and water, also contains sulphuric acid.

The advantage of the present invention is that the process provides a granulate containing magnesium and phosphorus and having both a high degree of stability and a high degree of magnesium availability.

A suitable phosphoric acid content in the granulating liquid is more than 40% by weight, determined as $P_2O_5$. By increasing the phosphoric acid content in the granulating liquid, the magnesium solubility increases, i.e. the amount of magnesium from which the animals benefit increases.

A suitable sulphuric acid content in the granulating liquid is more than 0.3% by weight, determined as $SO_4$. The addition of sulphuric acid to the granulating liquid results in a product having a higher degree of magnesium availability and a better stability than a product, which has been prepared without the addition of sulphuric acid in the granulation. The ratio of concentrations of phosphoric acid to sulphuric acid is preferably in the range of 3:1–200:1, and the total concentration of phosphoric acid and sulphuric acid in the granulating liquid is preferably more than 53% by weight, determined as $P_2O_5$ and $SO_4$, respectively.

Below, preferred embodiments will be described by means of a few examples and series of tests. They should not be considered to limit the scope of the present invention.

In the evaluations stated below, the Mg solubility has been measured according to a method referred to as the Klooster method. The Klooster method is carried out in the following manner:

150 mg of the composition is suspended in 350 ml of a buffer solution ($K_2HPO_4/KH_2PO_4$) at 39° C. and pH=6.5. Acetic acid (0.2 mole) is automatically added by means of an automatic buret (Radiometer, ABU 11) when the pH of the solution increases as a consequence of the dissolution of magnesium. In this manner, pH is maintained at 6.5. A recording apparatus (Radiometer, Titigraph SBR3) continuously records the amount of added acetic acid. After 1.5 h, the concentration of magnesium in the solution (atomic absorption) is measured and the magnesium content of the solution is calculated.

Moreover, in the evaluations below the stability was determined in the following manner:

The stability was tested in a rotating V-shaped cylinder. 200 g granules with a granular fraction of 1.4–0.25 mm were placed in the cylinder together with 5 ceramic balls having a diameter of 30 mm. The cylinder was rotated at 30 rpm for 10 min, after which the sample of the test material was screened once again and the amount of crushed product was indicated in per cent.

A number of tests were carried out in which the amount of water added to the granulating liquid was varied. The results appear from Table 1. The variations in the added amount of water appear from the greater or smaller amount of added % $P_2O_5$.

TABLE 1

Comparison with the amount of added water

| % $P_2O_5$ [1] | % Mg | % P | % S | Mg sol. [2] | Stabil. [3] |
|---|---|---|---|---|---|
| 40 | 31.5 | 9.7 | 0 | 25 | 8.0 |
| 50 | 28.7 | 12.5 | 0 | 52 | 5.9 |
| 40 | 31.5 | 9.7 | 2 | 63 | 7.7 |
| 50 | 28.7 | 12.5 | 2 | 81 | 5.7 |
| 38 | 28.1 | 10.0 | 4 | 72 | 5.0 |
| 47 | 25.9 | 11.6 | 4 | 84 | 3.3 |

[1] Phosphoric acid content of the granulating liquid expressed as $P_2O_5$.
[2] Mg solubility % relative according to the Klooster method.
[3] Stability expressed as % disintegration.

As indicated in the Table, the Mg solubility increases with a decreasing amount of added water, which in turn corresponds to a greater amount of added phosphoric acid expressed as % $P_2O_5$.

In connection with the above tests, also the amount of sulphuric acid which was added to the granulating liquid was varied, which is here expressed as the amount of sulphur in the granulating product. The connection between Mg solubility and the amount of added sulphuric acid is shown in Table 2.

TABLE 2

Comparison with different additions of sulphuric acid.

| % $P_2O_5$ [1] | % Mg | % P | % S | Mg sol. [2] | Stabil. [3] |
|---|---|---|---|---|---|
| 50 | 28.7 | 12.5 | 0 | 52 | 5.9 |
| 50 | 27.6 | 11.7 | 2 | 81 | 4.8 |
| 47 | 26.1 | 11.7 | 4 | 84 | 3.5 |

[1] Phosphoric acid content of the granulating liquid expressed as $P_2O_5$.
[2] Mg solubility % relative according to the Klooster method.
[3] Stability expressed as % disintegration.

As appears from the Table, the Mg solubility increases with an increasing amount of added sulphuric acid, and furthermore the stability of the product is maintained. In fact, there is no upper limit of the amount of added sulphuric acid, but the product gets a bitter taste if the sulphuric acid content becomes too high. However, concentrations ranging up to about 5% S in the product are convenient, but subsequently the bitter taste of sulphur begins to stand out from the other flavouring agents.

EXAMPLE 1

150 g magnesium oxide was charged into a drum granulator. Furthermore, 160 g phosphoric acid (58.7% $P_2O_5$) was added together with 15 g sulphuric acid as granulating liquid. In the granulating liquid, the phosphoric acid has a concentration of 53.7%, calculated as $P_2O_5$, and the sulphuric acid 8.1%, calculated as $SO_4$. A product having the following values was obtained:

TABLE 3

| % Mg | % P | % S | Mg sol. [1] | Stabil. [2] | Fine fract. [3] |
|---|---|---|---|---|---|
| 26.6 | 13.2 | 1.5 | 78 | 4.1 | 1 |

[1] Mg solubility % relative according to the Klooster method.
[2] Stability expressed as % disintegration.
[3] Fine fraction after storage, % fraction < 0.25 mm.

EXAMPLE 2

150 g magnesium oxide was charged into a drum granulator, after which 110 g phosphoric acid (58.7% $P_2O_5$) was added. After complete addition of the phosphoric acid, 17 g sulphuric acid (37.0% $SO_4$) and 26 g water were added. A product having the following values was obtained:

TABLE 4

| % Mg | % P | % S | Mg sol. [1] | Stabil. [2] | Fine fract. [3] |
|---|---|---|---|---|---|
| 30.4 | 9.9 | 2.2 | 53 | 6.8 | 2 |

[1] Mg solubility % relative according to the Klooster method.
[2] Stability expressed as % disintegration.
[3] Fine fraction after storage, % fraction < 0.25 mm.

The Mg solubility is not as great in this product as in the one in Example 1. This is due to the smaller amount of added phosphoric acid in this example, i.e. the amount of added water has not been minimised to the utmost possible extent.

It is, however, possible to add the sulphuric acid and phosphoric acid of the granulating liquid separately instead of together as one single granulating liquid, as in Example 1.

Finally, in Table 5 a product according to Example 1 has been compared with another prior-art product containing magnesium and phosphorus.

TABLE 5

A comparison of a prior-art product with a product from an embodiment of the present invention.

| Product | % Mg | % P | % S | Mg sol. [1] | Stabil [2] | Fine fract. [3] |
|---|---|---|---|---|---|---|
| TESSENDERLO [4] | 29.5 | 13.4 | 0 | 67 | 10.5 | 23 |
| New product [5] | 26.6 | 13.2 | 1.5 | 78 | 4.2 | 1 |

[1] Mg solubility % relative according to the Klooster method.
[2] Stability expressed as % disintegration.
[3] Fine fraction after storage, % fraction < 0.25 mm.
[4] Commercial product from Hydro Agri.
[5] A product according to the present invention.

As appears from the Table, a product prepared by the process according to the present invention has an excellent Mg solubility at the same time as the product has a satisfactory stability.

What is claimed is:

1. A process for preparation of a magnesium and phosphorus containing granular composition, which comprises granulating magnesium oxide in the presence being granulated with addition of a granulating liquid, which contains phosphoric acid and water, characterised in that the granulating liquid also contains sulphuric acid.

2. A process as claimed in claim 1, characterised in that the concentration of the phosphoric acid in the granulating liquid is more than 40% by weight, determined as $P_2O_5$, and that the concentration of the sulphuric acid in the granulating liquid is more than 0.3% by weight, determined as $SO_4$.

3. A process as claimed in claim 1 or 2, characterised in that the total concentration of phosphoric acid and sulphuric acid in the granulating liquid is more than 53% by weight, determined as $P_2O_5$ and $SO_4$, respectively.

4. A process as claimed in claim 1, characterized in that the ratio of concentrations of phosphoric acid to sulphuric acid is in the range of 3:1–200:1.

5. A process as claimed in claim 1, characterized in that the phosphoric acid and the sulphuric acid and water are mixed liquid is subsequently added to the magnesium oxide in a granulator device.

6. A process as claimed in claim 1, characterized in that the phosphoric acid, the sulphuric acid and water are added separately to the magnesium oxide in a granulator device.

* * * * *